3,395,799
METHOD AND APPARATUS FOR THE
TREATMENT OF SEWAGE
Harold I. Kurtz, 113 Bellefield Drive,
Butler, Pa. 16001
Filed Mar. 30, 1967, Ser. No. 627,224
13 Claims. (Cl. 210—1)

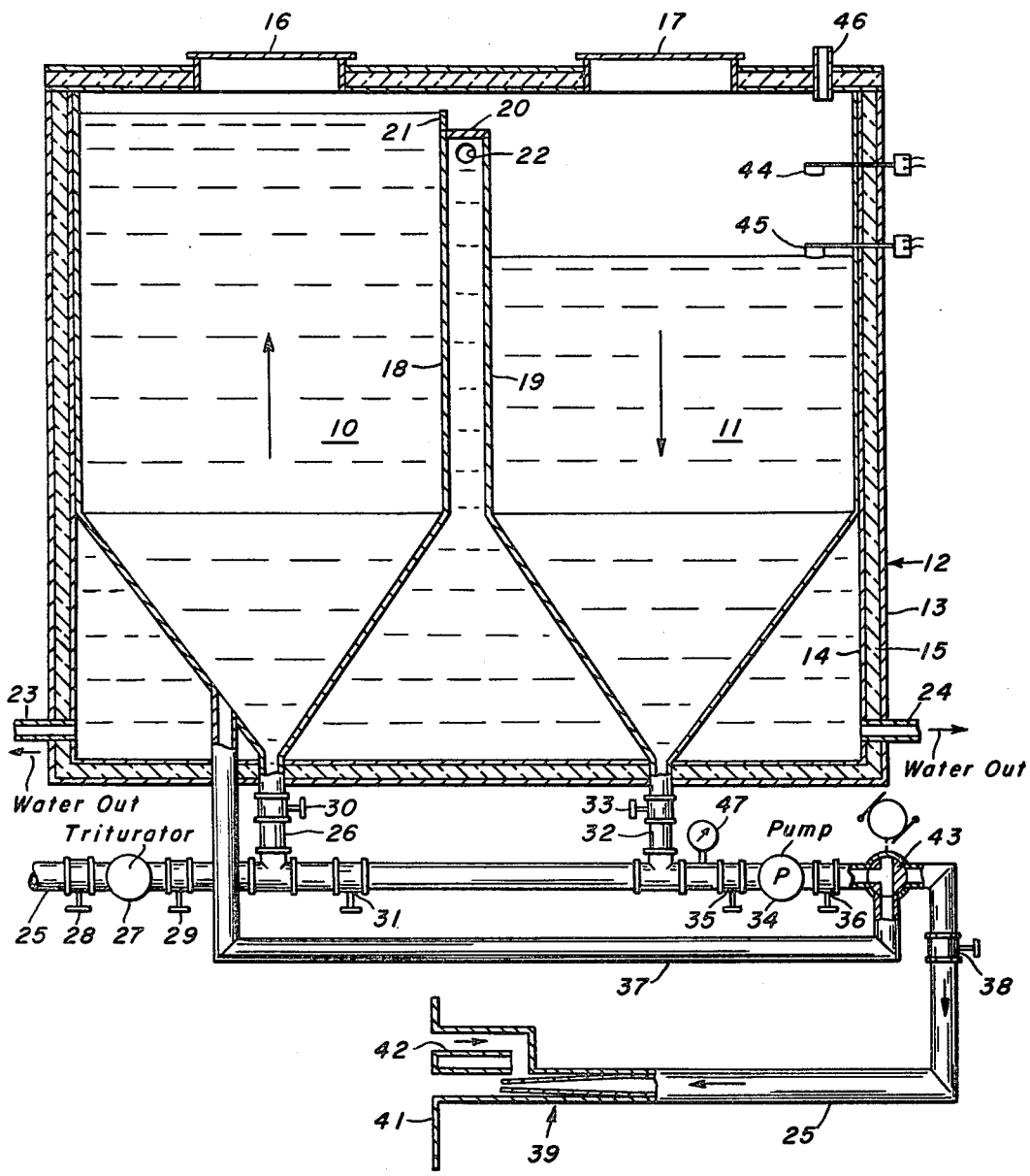

ABSTRACT OF THE DISCLOSURE

This invention relates to the treating of raw sewage and particularly to the heat treating of raw sewage aboard water-borne vessels. According to the invention raw solid-containing sewage is first passed through a triturator where the solid particles are finely ground. Thence the raw sewage is influent into a retention tank where the sewage is heat treated at a pre-determined temperature for a pre-determined time before finally being discharged overboard. Preferably two tanks are provided, the first tank discharging into a second tank over a weir intermediate the two tanks. For a period of time the sewage is circulated between the first and second tanks until a level in the second tank reaches a pre-determined level whereupon a discharge cycle is initiated and the heat treated sewage is discharged overboard. In the case of water-borne vessels, the tanks would normally be designed to accommodate 24 hours accumulation of sewage from the crew members. Heat for the treating of the sewage may be supplied from any suitable source, however, the preferred source is the heated water from the engine cooling system aboard the vessel or other heated water from the cooling systems of other apparatus, such as generators, located aboard the vessel. In this manner an economical source of heat may be supplied. The heated engine cooling water is circulated around the sewage retention tanks so that there is no contact between the heating medium and the sewage liquor. By using the present invention all pathogenic bacteria are effectively destroyed.

Background of the invention

*Field of the invention.*—The field to which this invention relates is that wherein raw solid-containing sewage is first comminuted, then confined in a storage tank or the like and while so confined treated with heat to destroy all pathogenic bacteria, then finally discharged.

*Description of the prior art*

In municipal sewage treatment plants raw solid-containing sewage influent to the plant is first passed to a settling tank where the solids are permitted to settle to form a sludge. This sludge may then be passed to one or more aerobic digester tanks where the sludge is reduced by bacterial decomposition to inert solids. The sewage liquor from which the solids have settled is then usually treated chemically thence discharged into a receiving stream.

In vessels such as tow boats which navigate on the inland waterways, raw sewage may simply be discharged overboard without any treatment of any kind. In other cases the raw sewage may be retained for a period of time in a chemical treatment tank where it is treated with a suitable chemical solution such as a hypochlorite solution. This treatment, however, is ineffective in many cases since the chemical must contact the bacteria to be effective and in the case of solid particles a chemical may not have penetrated sufficiently to kill the bacteria in the core of the particle so that active pathogenic bacteria can be still present even in heavily chlorinated sewage.

The use of chemicals in any event has several drawbacks. Among these are the initial cost of the chemicals and the additional costs of storing and handling them. But perhaps the primary objection to the use of chemical bactericides is that many of these are themselves stream pollutants and are toxic to the marine life found in the receiving stream.

At the present time both Federal and State authorities are placing increasing emphasis on the need for clean streams and to this end both Federal and State authorities have enacted strict legislation governing the pollution of streams by industrial concerns and the like. An economical method of treating sewage is therefore desirable to all persons who use the inland waterways and particularly to towboat operators and the like.

Summary of the invention

The present invention provides an apparatus which will enable the economic compliance with even the most stringent regulations regarding stream pollution. According to the present invention raw solid-containing sewage is first macerated thence passed to a heat treating tank where the sewage is effectively heated to kill all pathogenic material contained therein. Heat treating is carried on at a temperature of at least 140° F. for a period of at least 30 minutes, the heat being provided from a suitable available source such as the cooling water from the engines and exhaust manifold, but other heating means such as electrical heaters could be employed either alone or in combination with the heated cooling water. Preferably two tanks are provided, the raw sewage being influent into the first tank which overflows into a second tank from which the sewage liquor is recirculated back to the first tank. When the level in the second tank reaches a pre-determined level a suitable liquid level sensing means is activated to automatically open a valve to effect the discharge of sewage in the second tank until the level in that tank again reaches a pre-determined lower level, when the discharge ceases and the cycle is repeated as before. During discharge of the sewage the sewage is pumped overboard through an eductor which draws in fresh water from the ambient stream to effect an immediate rapid dilution of the effluent sewage. The retention tanks are preferably surrounded by an outer shell in which is circulating the heated water as before described. The retention tanks preferably have a capacity which will enable a vessel to hold all the sewage from its entire crew for a period of about 24 hours. This avoids the necessity for discharging sewage while the boat is standing idle at a municipal dock or the like.

The invention thus avoids most of the difficulties of the prior art and provides an economic and effective means for destroying all pathogenic bacteria contained in the sewage. The maceration of the sewage prior to being heat treated assures effective, rapid and intimate contact with the heat for all solid particles in the sewage. The use of a source of heat already aboard the vessel and which is otherwise wasted provides or makes the invention economically feasible. Although chemical treatment could be used in conjunction with the heat treatment this is not at all necessary.

An object of the invention is to provide a new and useful method and apparatus for the treating of sewage particularly aboard water-borne vessels and the like.

Brief description of the drawing

The drawing which is partly in section illustrates one embodiment of the sewage treatment plant according to the invention.

Referring to the drawing, the sewage treatment plant comprises a pair of tanks 10 and 11, surrounded by an outer enclosing shell 12.

Shell 12 is a water-tight enclosure having spaced outer and inner shells 13 and 14 with a heat-insulating material 15 disposed in the space between them. Access doors 16 and 17 are provided in the shell 12 for access to the interior of tanks 10 and 11 for cleaning and maintenance purposes.

Tanks 10 and 11 are essentially the same construction, each being generally rectangularly shaped in cross section in their upper portions, open at the top, and having a generally conical or pyramidal shaped bottom portion with sloping side walls converging toward the bottom. Confronting side walls 18 and 19, on tanks 10 and 11 respectively, are spaced apart to permit the circulation of water or heating fluid therebetween. The tanks 10 and 11 communicate at the upper portions thereof since walls 18 and 19 terminate short of the top wall of the enclosing shell 12. Walls 18 and 19 are connected at the top by a horizontal plate 20 which extends the full width of the tanks. Wall 18 is slightly higher than wall 19 to form a weir 21 over which sewage may flow from tank 10 to tank 11. Weir 21 also extends the full width of the tanks.

Opening into the shell 12, there is a water inlet 22 communicating with the interior of the shell and the exterior of tanks 10 and 11. Preferably the opening 22 is located near the tops of the tanks such as here shown, near the plate 20 in the space between walls 18 and 19. Water outlets 23 and 24 conduct water from tank 12 back to a source (not shown) such as the engine or generator cooling water systems which provide a ready source of heated water aboard a towboat.

Preferably tanks 10 and 11 are provided with an interior surface of stainless steel in order to facilitate cleaning and to minimize rust problems.

Raw solid-containing sewage is introduced from pipe 25 which communicates with the bottom of tank 10 through a branch pipe 26. The sewage is first passed through a triturator 27 which reduces the solids in the sewage to very small particles. Manually operated, normally open valves 28 and 29 are located in pipe 25 on either side of triturator 27 so it can be isolated for maintenance. Manually operated, normally closed valve 31 is located in pipe 25 downstream of pipe 26 and upstream of branch pipe 32 which communicates with pipe 25 and the bottom of tank 11. There is a manually operated, normally open valve 33 in branch pipe 32 to enable isolation of tank 11 from pipe 25 when desired.

In pipe 25 downstream of branch pipe 32 there is a pump 34 which pumps treated sewage overboard through pipe 25. Manually operated, normally open valves 35 and 36 are located on either side of pump 34 so that the pump may be isolated when desired.

Downstream of valve 36 there is a reflux line 37 connected at one end to pipe 25 and at its other end to tank 10 at a location spaced above the raw sewage inlet pipe 26 opening into tank 10.

In pipe 25 downstream of the reflux line 37 there is a manually operated, normally open valve 38, followed by a dilution eductor indicated generally at 39 in the discharge end of pipe 25. The eductor 39 comprises a nozzle 40 in line 25 which discharges sewage overboard through an opening in the side of the vessel indicated at 41, below the water line. There is a conduit 42 in the vessel which communicates with the fresh water in a receiving stream and with the discharge end of nozzle 40 so as to draw water into the discharge sewage to dilute it. The inlet side of conduit 42 should be spaced sufficiently from the sewage discharge opening to prevent discharged sewage from being recirculated. It is also preferable that the sewage outlet be located at the bottom of the vessel so discharge will take place toward the propulsion screws of the vessel, thereby to effect more rapid dissipation of the discharged sewage.

At the juncture of reflux line 37 with line 25 there is a motor operated three-way valve 43 which is positionable so as to open line 25 while closing line 37 or vice versa. Valve 43 is operable in response to liquid level sensors 44 and 45 located in tank 11 at different levels therein. Suitable circuitry (not shown), well-known in the control arts, is provided to operate valve 43 in accordance with the sensor signals in the manner hereafter described.

At the top of shell 12 there is a vent 46 which communicates with the interior of shell 12 and tanks 10 and 11 to vent sewage gases. The vent may be connected at its other end to a stack on the vessel.

47 is a temperature measuring device and indicator located in line 25 intermediate pipe 32 and pump 34.

The combined capacity of the two tanks 10 and 11 is preferably sufficient to retain all the sewage generated by the entire crew of the vessel over a 24 hour period. Statistics indicate that the average amount of sewage per man per day is about 30 gallons, although sometimes reaching as high as 50 gallons per man per day. Taking 40 gallons per man per day as a reasonable average with some excess capacity provided for, a vessel with a normal crew of eight men should have a tank retention capacity of about 320 gallons of sewage. This capacity is desirable so that a vessel which is docked for a full day need not discharge any sewage in the dock area.

The heat source for heating the contents of tanks 10 and 11 is preferably a readily available source of heat which is otherwise wasted, such as the cooling fluid for the engines or generators found aboard a vessel. If desired the heat source may be electric heaters or the like used alone or in conjunction with other heating means.

The circulation of heated water around the tanks 10 and 11 provides a uniform heat over a large surface for effective heat transfer to the sewage in the tanks without any contact between the heating means and the sewage.

The temperature to which the sewage is heated should be at least about 140° F. for a period of about 30 minutes, which is more than sufficient to kill substantially all pathogenic bacteria in the sewage. The trituration of the sewage solids insures a rapid penetration of the heat throughout all solid particles. Higher temperatures may be employed, in which case lower treating times would be adequate to kill all pathogenic bacteria. Normally engine cooling water would be at a temperature much higher than 140° F.

In operation, raw solid-containing sewage from all usual sources aboard a vessel, such as commodes, urinals, wash basins, showers and galley, are discharged to a common pipe 25 and pass through the triturator 27 and enter tank 10 where it is immediately subjected to heat from the hot water around the tank. As the sewage continues to accumulate the level in tank 10 rises to the weir 21 and the sewage flows over the weir into tank 11 where it continues to be subjected to heat. So long as the liquid level in tank 11 is below sensor 44, three-way valve 43 is in a position so as to close off the discharge end of pipe 25 and open the reflux line 37 whereby sewage is continuously recirculated by pump 34 from tank 11 back to tank 10. This effects a continuous agitation of the sewage and the thorough distribution of heat, as well as insuring an effective bactericidal treatment.

When the level in tank 11 rises high enough to activate sensor 44, three-way valve 43 is automatically positioned so as to close off the reflux line 37 and open the discharge end of pipe 25, whereby treated sewage is discharged overboard through eductor 39 which draws in diluting water from the receiving stream as before described. It will be recalled that valve 31 is normally closed so that discharge takes place only from tank 11. When sufficient sewage has been discharged to lower the level in tank 11 back to the level of sensor 45, the three-way valve 43 is automatically returned to its original position for reflux of the sewage. Thus in normal operation the tank 10 is filled to the level of weir 21 and the level in tank 11 fluctuates between the levels determined by sensors 44 and 45.

By manipulation of the various valves it is possible to drain both tanks for cleaning and maintenance and to bypass the heat treating tanks completely if desired.

From the foregoing description it is apparent that there is provided a method and apparatus which efficiently and effectively heat treats sewage to kill all pathogenic bacteria therein and renders the sewage harmless to the receiving stream. The trituration of solid particles and the dilution of the discharged sewage contributes also to the maintenance of the aesthetic characteristics of the receiving stream.

It will be apparent to those skilled in the art that variations and modifications in the construction and arrangement of parts and in the various steps of the method are possible within the scope and spirit of the invention.

I claim:

1. The method of treating solid-containing sewage comprising:
   (a) providing first and second treating tanks for the containment of the sewage to be treated,
   (b) providing an enclosure about the treating tanks,
   (c) circulating heated water in the enclosure around the exterior of the treating tanks to heat the contents of the tanks to at least about 140° F.,
   (d) introducing solid-containing sewage to the first tank for heat treatment,
   (e) passing the heat-treated sewage to the second tank for further heat treatment,
   (f) recirculating the heat-treated sewage from the second to the first tank and continuing to so recirculate the sewage until the sewage in the second tank reaches a pre-determined maximum level,
   (g) then stopping the recirculation and effecting discharge of the sewage from the second tank to a receiving stream.

2. The method as defined in claim 1 wherein
   (a) the discharge from the second tank is continued until the level in the second tank falls to a pre-determined level below the first mentioned pre-determined maximum level, and
   (b) then discontinuing the discharge and resuming the recirculation as before.

3. The method as defined in claim 1 including the trituration of the sewage solids prior to being introduced into the first tank.

4. The method as defined in claim 1 including the dilution of the treated sewage prior to discharge into a receiving stream.

5. Apparatus for the heat treatment of solid-containing sewage, comprising
   (a) first and second tanks for containment of the sewage,
   (b) an enclosure about the tanks,
   (c) means for circulating heated water in the enclosure about the exterior of the tanks,
   (d) means for introducing the sewage into the first tank,
   (e) means for circulating sewage from the first tank to the second tank and vice versa, and
   (f) means for periodically interrupting the circulation of sewage from the second tank to the first tank and for discharging sewage from the second tank during the period of interrupted circulation.

6. Apparatus for the heat treatment of solid-containing sewage, comprising,
   (a) first and second tanks for the containment of sewage to be treated, the tanks being open at the top,
   (b) a weir between the tanks and over which sewage may flow from the first to the second tank,
   (c) an enclosure about the tanks,
   (d) means for the circulation of heated water in the enclosure and about the exterior of the tanks to heat the contents of the tanks,
   (e) a first pipe connected to the first tank for introducing raw sewage to the first tank,
   (f) a second pipe connected to the second tank for the flow of sewage therefrom to a discharge station at the terminal end of the second pipe,
   (g) a third pipe connected to the second pipe at a juncture and to the first tank for the recirculation of sewage from the second tank back to the first tank, and,
   (h) valve means in the second and third pipes for opening and closing the second and third pipes to the flow of sewage from the second tank.

7. Apparatus as defined in claim 6, including a triturator in the first pipe for comminution of solid particles in the sewage influent to the first tank.

8. Apparatus as defined in claim 6, including a pump connected to the second pipe in advance of the juncture of the second and third pipes.

9. Apparatus as defined in claim 6, including an eductor in the terminal end of the second pipe and connected to a source of fresh water for diluting the effluent sewage with fresh water.

10. Apparatus as defined in claim 6 including an access hatch in the tank enclosure for access to the interior of the tanks, and a vent in the enclosure communicating with the interior of the tanks.

11. Apparatus as defined in claim 6 wherein the bottoms of each of the tanks have downwardly converging sloping walls and the first and second pipes are connected respectively to the bottoms of the first and second tanks.

12. Apparatus as defined in claim 6, wherein the valve means is a three-way valve connected at the juncture of the second and third pipes, the valve having a first position whereat the second pipe is closed to the flow of sewage downstream of the juncture and the third pipe is open for the recirculating flow of sewage from the second tank to the first tank, and a second position whereat the third pipe is closed and the second pipe open to discharge.

13. Apparatus as defined in claim 12, including liquid level sensors in the second tank operatively connected to the three-way valve for positioning the valve into and out of its first and second positions in accordance with the liquid level in the second tank.

References Cited

UNITED STATES PATENTS

| 2,140,511 | 12/1938 | Cline | 210—177 X |
| 2,190,598 | 2/1940 | Fischer | 210—124 X |
| 2,938,630 | 5/1960 | Novak | 210—177 X |
| 3,219,579 | 11/1965 | Kranz | 210—180 X |

FOREIGN PATENTS

| 247,066 | 2/1926 | Great Britain. |
| 652,585 | 11/1962 | Canada. |

MICHAEL E. ROGERS, *Primary Examiner.*